US008123116B2

(12) United States Patent
Lundgren et al.

(10) Patent No.: US 8,123,116 B2
(45) Date of Patent: Feb. 28, 2012

(54) FUEL DISPENSER WITH INTELLIGENT SWITCH

(75) Inventors: Christer Lundgren, Hoor (SE); Per Kristiansson, Arlov (SE)

(73) Assignee: Dresser, Inc., Addison, TX (US)

(*) Notice: Subject to any disclaimer, the term of this patent is extended or adjusted under 35 U.S.C. 154(b) by 939 days.

(21) Appl. No.: 12/124,928

(22) Filed: May 21, 2008

(65) Prior Publication Data

US 2008/0290152 A1 Nov. 27, 2008

(30) Foreign Application Priority Data

May 23, 2007 (EP) .................................... 07108732

(51) Int. Cl.
*G06F 17/00* (2006.01)

(52) U.S. Cl. ........................................... 235/375; 71/40

(58) Field of Classification Search .................. 235/375; 71/40

See application file for complete search history.

(56) References Cited

U.S. PATENT DOCUMENTS

| | | | | | |
|---|---|---|---|---|---|
| 5,270,943 | A * | 12/1993 | Warn | ........................... | 700/241 |
| 5,602,745 | A * | 2/1997 | Atchley et al. | ................ | 705/413 |
| 6,067,476 | A | 5/2000 | Siler | | |
| 6,082,618 | A * | 7/2000 | Brown | .......................... | 235/381 |
| 2004/0088122 | A1* | 5/2004 | Nanaji et al. | .................... | 702/45 |

OTHER PUBLICATIONS

Extended European Search Report for EP Application No. 07108732.4 dated Oct. 16, 2007 (6 pages).

* cited by examiner

*Primary Examiner* — Michael G Lee
*Assistant Examiner* — Kristy A Haupt
(74) *Attorney, Agent, or Firm* — Woodcock Washburn LLP

(57) ABSTRACT

A system for providing dispensing of fuel for refuelling vehicles, comprising a control unit and at least two switches. Each of said switches is connected to the control unit and comprises a microcontroller for storing a unique identifier, which identifier is associated with the switch and readable by the control unit, for allowing the control unit to identify each of the at least two switches.

18 Claims, 2 Drawing Sheets

FUEL DISPENSER WITH INTELLIGENT SWITCH

CLAIM OF PRIORITY

Under 35 U.S.C. §119, this application claims the benefit of a foreign priority application filed in the European Patent Convention, serial number 07108732.4, filed May 23, 2007, the entire contents of which are hereby incorporated by reference.

TECHNICAL FIELD

The present invention relates to a system for providing dispensing of fuel, in particular a fuel dispensing unit and a fuel payment terminal, and various techniques for detecting specific events associated with the system.

BACKGROUND ART

Different techniques are available on the market for detecting events occurring in connection with a fuel dispensing unit and/or a fuel payment terminal. Some events that should be detected are related to the operation of the fuel dispensing unit, such as detecting if a fuel dispensing nozzle is lifted from its nozzle boot, what kind of fuel grade is selected for dispensing etc. Other events are related to misuse of the dispenser, e.g. attempts to steal fuel.

Today, switches that employ magnetic field sensors, push-buttons, etc. are used for detecting certain events. Moreover, it is known that fuel dispensers may incorporate nozzle detecting switches that are capable of performing logical operations. However, at present it is not clear what kind of logic such switches perform.

A problem with switches for fuel dispensing units is that it is hard to use a more common switch design for detecting several different kinds of events, such as lifting a fuel dispensing nozzle, selecting a specific fuel grade, releasing a theft alarm, etc.

In cases of burglary and other tampering for the purpose of stealing fuel, anti-theft systems are used which incorporate some kind of tamper-detecting sensor that breaks a switch which thus gives or breaks a signal between the fuel dispensing unit and a central unit. When this occurs contact is lost between the fuel dispensing unit and the central unit, an alarm is initiated and the fuel dispensing unit is inactivated. Inactivation involves, for instance, setting a logic variable in the control system of the pump at a certain value so that that pumping is not allowed, or, in a mechanical control system, activating a mechanical stop which physically prevents pumping.

U.S. Pat. No. 6,067,476, for example, discloses a technique for protecting a fuel dispenser unit by detecting tampering with a totalizing device acting to keep a running total of fuel dispensed from the fuel dispenser. An electric circuit is included and contains a coil that emits a magnetic pulse that is responsive to a condition consistent with proper totalizer operation. Arrangements are included for sensing the presence of the magnetic pulse, generating a signal responsive thereto and causing an alarm responsive to absence of the magnetic pulse.

A drawback of the above-described anti-theft systems is that they still can relatively easily be tampered with so as to allow theft of fuel. By existing components being bypassed, joined with tape, broken to pieces or replaced with other components, the fuel dispensing unit can be started so that theft of fuel can take place.

SUMMARY OF THE INVENTION

A system for providing dispensing of fuel for refuelling vehicles is described, comprising a control unit and at least two switches. Each of said switches is connected to the control unit and comprises a microcontroller for storing a unique identifier, which identifier is associated with the switch and readable by the control unit, for allowing the control unit to identify each of the at least two switches.

In one embodiment, each switch has an identifier, which facilitates the switch's communication with the control unit and provides for versatile operation of the switches and use of more standardized switches. Of course, each switch is configured to detect a certain event, e.g. selection of a specific fuel grade, tampering of the system etc.

Each switch may comprise a power source, for allowing the switch to operate independently of the control unit and thereby, for example, provide for a more versatile and/or tamper-proof implementation of the switch, since the switch is no longer dependent on an external power source.

Each switch may be configured to store a key which represents a condition where tampering of the fuel system is not detected, which provides a switch-status indicating, for example, that dispensing of fuel is allowed. This embodiment specifically addresses the aspect of tampering.

The key may be altered when the switch is released, and the key may be altered when the connection between the switch and the control unit is lost, which presents a simple and efficient way of indicating that undesired events have taken place.

The control unit may be configured to store a copy of each key, for the purpose of verifying if tampering of the system has occurred, and the control unit may be configured to regularly read the key for each switch, which provides a system that may continuously monitor its switches, which in turn renders tampering with the switches even harder.

The control unit may be configured to regularly change the key for each switch, which makes tampering even harder.

Each of the at least two switches may be connected to the control unit via a common communication line, which reduces the cost of manufacturing the fuel dispenser, as well as improves versatile use of the switches.

According to another aspect of the invention, a fuel dispensing unit for refuelling vehicles is provided, which comprises a system according to any of the embodiments described above.

The control unit may be arranged in a first subspace of the fuel dispensing unit and each of the at least two switches may be arranged in a second subspace of the fuel dispensing unit, for physically separating the switches from the control unit.

The first subspace and the second subspace may be arranged for preventing fuel vapour from spreading between the subspaces, which allows the control unit to be powered with a relatively higher voltage. This provides for a more simple and cost efficient control unit for the switches while the risk of explosion is reduced.

In the fuel dispensing unit, each of the switches may be connected to the control unit via a barrier device for explosion protection, said barrier device disposed between the switches and the control unit, which further reduces the risk of explosion.

In the fuel dispensing unit, a sealing member may be arranged between the first subspace and the second subspace for close abutment against a communication line that connects each of the at least two switches to the control unit, which efficiently decreases the risk of explosion.

In the fuel dispensing unit, a fuel flow meter may be connected to the communication line, and each of the switches may be connected to the control unit via the fuel flow meter, which provides for a fuel dispenser that allows more cost efficient implementation of the switches.

The switches may be arranged for detecting a respective fuel dispensing nozzle, which provides a solution where the overall cost of implementing the switches is further reduced.

According to yet another aspect of the invention, a fuel payment terminal for paying for fuel is provided, which comprises a system according any of the embodiments described above.

It should be noted that the "identifier" described above may represent the "key", or vice versa.

Moreover, a "microcontroller" is an electronic circuit that comprises a memory, an input/output interface and a capability of performing at least one logic operation.

BRIEF DESCRIPTION OF THE DRAWINGS

Embodiments of the present invention will now be described, by way of example, with reference to the accompanying schematic drawings, in which.

DETAILED DESCRIPTION OF THE INVENTION

Figure 1:
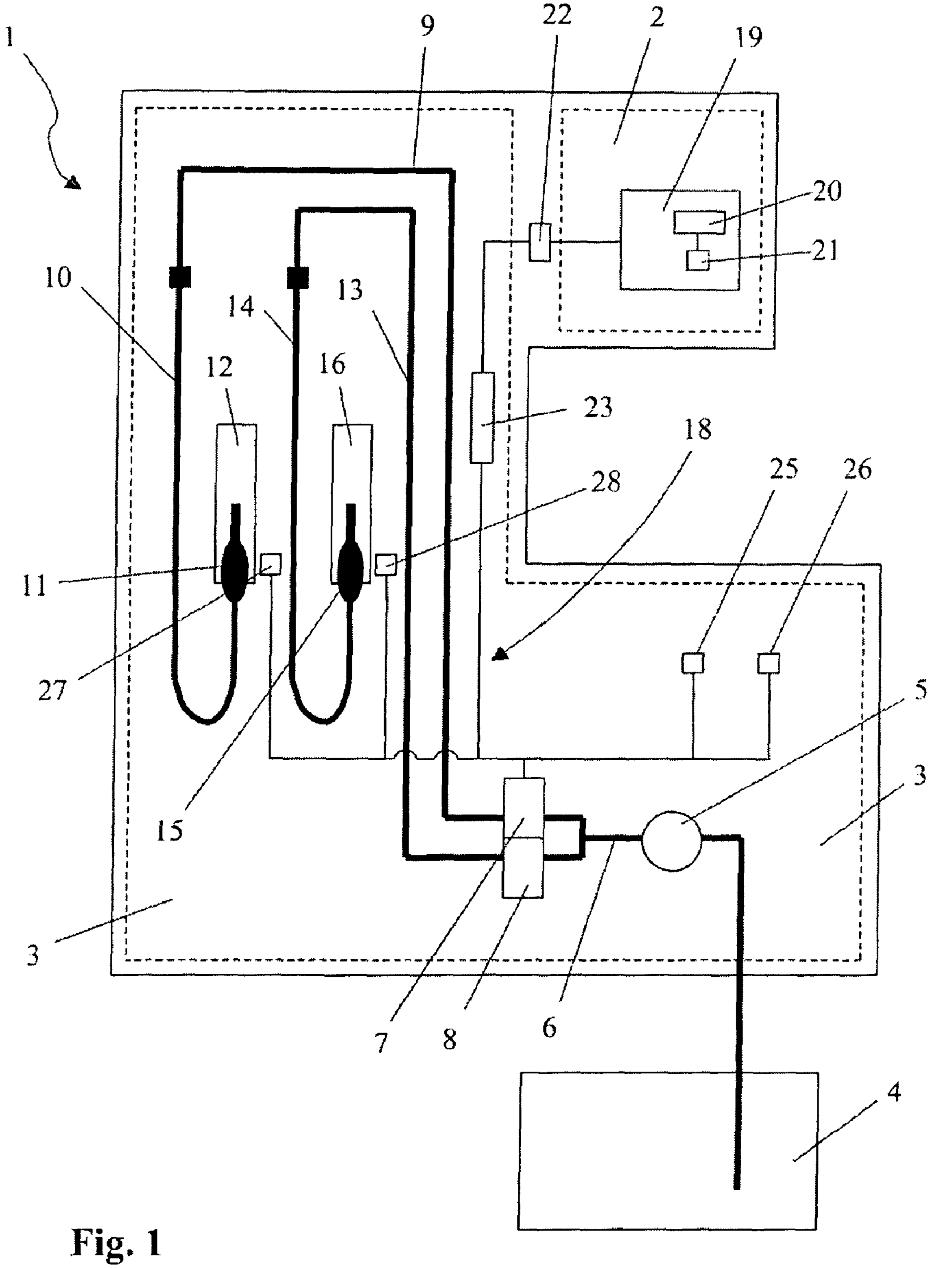
FIG. 1 is a schematic view of the inventive system incorporated in a fuel dispensing unit.

FIG. 1 illustrates one embodiment of a fuel dispensing unit 1 that incorporates the system and which is divided into a first subspace 2 and a second subspace 3. Both subspaces 2, 3 are indicated by dashed lines. In the second subspace 3 a fuel line 6 is arranged for drawing fuel from a fuel reservoir 4. The fuel line 6 comprises a fuel pump 5 for generating a stream of fuel, which is divided into two separates streams, each entering a respective fuel meter 7, 8. The first fuel meter 7 is connected downstream to a first fuel line 9 to which a first, flexible fuel hose 10 is connected. The first fuel hose 10 has a fuel dispensing nozzle 11 for dispensing fuel into a tank of a vehicle (not shown).

The second fuel meter 8 is connected downstream to a second fuel line 13 to which a second, flexible fuel hose 14 is connected, which in turn has a fuel dispensing nozzle 15 to corresponding the nozzle 11 of the first fuel hose 10. When the fuel dispenser 1 is not operated, each of the nozzles 11, 15 rest in a respective nozzle boot 12, 16 arranged on the side of the fuel dispenser 1.

Preferably, each fuel meter 7, 8 has a unique identifier corresponding to the identifiers of the switches described blow.

In the first subspace 2, a control unit 19 is arranged for controlling the operation of the fuel dispenser 1. The control unit 19 is connected to the fuel meters 7, 8 via a communication line 18 and receives from the fuel meters 7, 8 signals representative of an amount of fuel dispensed at the fuel dispensing nozzles 11, 15. The control unit 19 has a conventional, suitable processor 20 and a memory 21.

Since certain electric voltages are present in the control unit 19, the communication line 18, as shown, includes an EExi barrier device 23 which is arranged between the control unit 19 and fuel meters 7, 8 in order to provide explosion protection for flammable fuel present in, for example, the fuel meters 7, 8. The EExi barrier device 23 is preferably an electronic device having a protective function in potentially explosive atmospheres, and its technical requirements are stipulated in Directive 94/9/EC (ATEX). The EExi barrier device 23 may also be a barrier device according to CENELEC standards, or according to any other suitable standard for providing the required protection. Instead of an EExi barrier device 23, an EExd, EExp, EExn or EExm barrier device may be used, or any other device providing similar functionality. In brief, the barrier device 23 is intrinsically safe by ensuring that electric current and voltage levels are reduced in the electric components that are arranged in the second subspace 3, where fuel vapour is more common.

The first subspace 2 is sealed from the second subspace 3 by means of a boxlike structure (not shown) made of steel or plastic and encloses the control unit 19 and thereby prevents fuel vapour from spreading from the second subspace 3 to the first subspace 2. Preferably, a sealing member 22 is arranged between the first subspace 2 and the second subspace 3. The sealing member 22 comprises two flexible members that abut closely against the communication line 18 and thereby provide a vapour tight cable penetration between the subspaces 2, 3.

Optionally, spreading of fuel vapour between the subspaces 2, 3 is prevented by the first subspace 2 and the second subspace 3 being arranged at a specific, minimum distance from each other.

Two switches 25, 26 are arranged in the second subspace 3 for detecting events indicative of misuse of the fuel dispensing unit 1. The switches 25, 26 detect in a conventional manner, for example, opening of a front panel (not shown), vibrations and impacts on the fuel dispensing unit, a sound having a frequency corresponding to a frequency generated when drilling through a front panel of the fuel dispensing unit 1, or any other event indicative of misuse of the fuel dispensing unit 1.

As shown, each switch 25, 26 is connected to the control unit via the communication line 18 which is common for the two switches 25, 26. This means that signals between the control unit 19 and each switch 25, 26 pass along the same wire in the communication line 18.

The communication line 18 may, of course, have multiple wires, but signals from both switches 25, 26 are typically sent to the control unit 19 via a common wire of the multiple wires.

Moreover, a first nozzle detecting switch 27 is arranged at the first nozzle boot 12, while a second nozzle detecting switch 28 is arranged at the second nozzle boot 16. Each nozzle detecting switch 27, 28 has a magnetic sensor that detects a magnetic field generated by a magnet (not shown) arranged in the respective fuel dispensing nozzle 11, 15, when respective fuel dispensing nozzle 11, 15 is properly placed in its nozzle boot 12, 16. Both nozzle detecting switches 27, 28 are connected to the control unit 19, via the communication line 18 which, as shown, is common also for the two switches 27, 28, in a manner that corresponds to the connection of the previously discussed tamper-detecting switches 25, 26.

Figure 2:
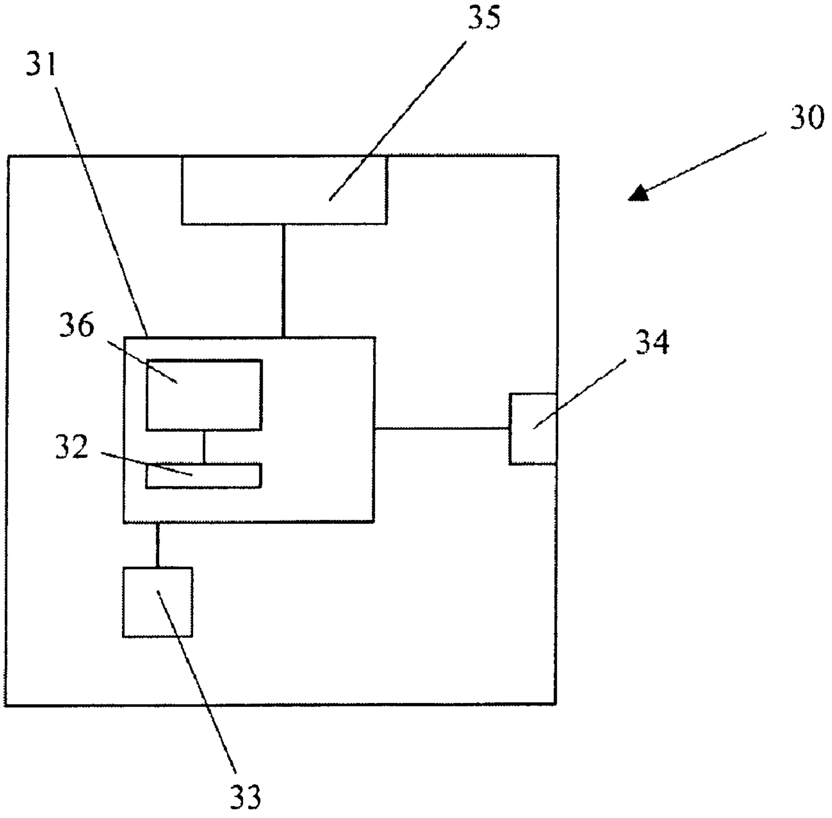
FIG. 2 is a schematic view of a switch according to the invention.

The switches 25, 26, 27, 28 discussed above are illustrated by the generic switch 30 illustrated in FIG. 2. The switch 30, as shown, has a conventional, suitable microcontroller 31 which comprises a central processing unit 36, a combined RAM and ROM memory unit 32, input/output interfaces and a clock generator (not shown).

The switch 30, as shown, also includes a battery 33 and a connector 34, which both are connected to the microcontroller 31. The connector 34 is arranged for connecting the switch 30 to the communication line 18. The switch 30 also incorporates a sensor 35 which communicates with the microcontroller 31. Depending on the field of application for the switch

30, the sensor 35 is configured to detect a specific sound, a magnetic field, vibrations etc. The components of the switch 30 cooperate in a conventional manner, and the earlier described switches 25, 26, 27, 28 are typically, except for the sensor 35 that depends on the particular application area for each switch 25, 26, 27, 28, structurally identical with the switch 30 of FIG. 2.

Each of the switches 25, 26, 27, 28 are during normal operation powered by the control unit 19 via the communication line 18, but if the connection with the control unit 19 is lost, the switch may be powered by its battery 33. However, since the nozzle detecting switches 27, 28 are not arranged for detecting misuse of the fuel dispenser 1, backup power is not crucial for the nozzle detecting switches 27, 28 and hence their batteries may be omitted.

In the memory 32 of each switch 25, 26, 27, 28 a unique identifier is stored, i.e. each switch 25, 26, 27, 28 has a unique identifier, and in the memory 21 of the control unit 19 each unique identifier is stored. During communication over the communication line 18 each signal to and from the switches 25, 26, 27, 28 incorporates such a unique identifier, and each switch 25, 26, 27, 28 is in a conventional manner arranged to respond only to signals involving its unique identifier. In a corresponding manner signals from the switches 25, 26, 27, 28 incorporate its unique identifier, which enables the control unit 19 to, in a conventional manner, identify from which switch 25, 26, 27, 28 the signal is sent. Of course, in this context a "signal" means a data package or signal package.

In the communication line 18 data is carried in bit-serial form, and any suitable serial bus specification may be employed for the connection and communication between the control unit 19 and the switches 25, 26, 27, 28, such as, for example, the CAN-specification.

Each of the tamper-detecting switches 25, 26 has a key stored in its memory 32, which key is also stored in the control unit 19. The control unit 19 repeatedly, e.g. once every 30 seconds, interrogates each tamper-detecting switch 25, 26 for its key, and as long as a correct key is received, operation of the fuel dispensing unit 1 is allowed. However, when a tamper-detecting switch 25, 26 indicates detection of the event that it is configured to detect, the key is deleted from its memory 22, preferably by the switch itself. This means that the control unit 19 will not longer receive a correct key, which is interpreted by the control unit 19 as misuse of the fuel dispensing unit 1 and which triggers a suitable alarm, such as a warning signal in a manned petrol station. If the connection between a tamper-detecting switch 25, 26 and the control unit 19 is lost, the control unit 19 receives no answer at all from the switch 25, 26, which also triggers the alarm.

After a tamper-detecting switch 25, 26 is released and is reset by maintenance personnel, the control unit 19 sends a new key to the released switch 25, 26.

The communication line 18 may also be a wireless communication line, in which case any suitable radio-frequency means are incorporated in the fuel dispenser.

Figure 3:
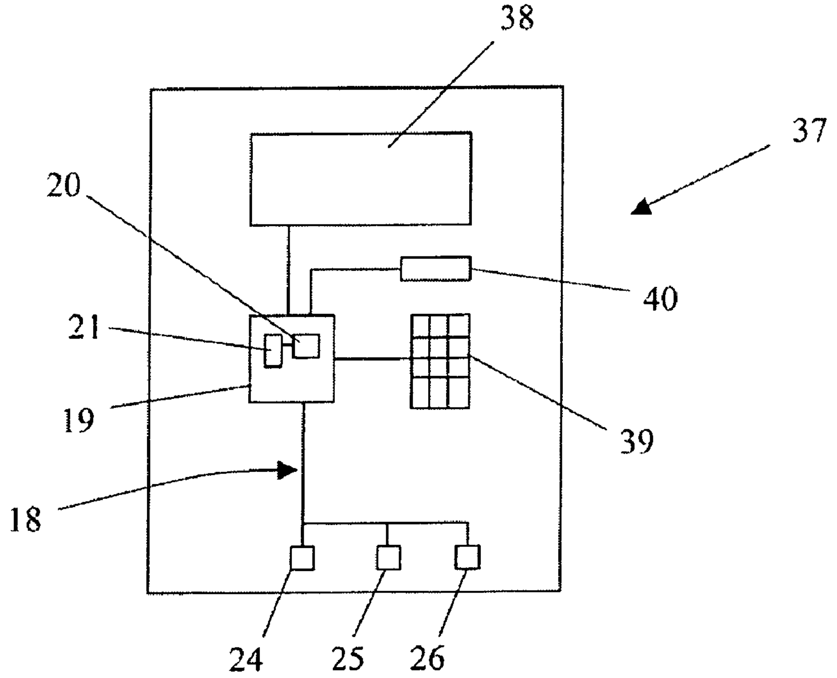
FIG. 3 is a schematic view of the inventive system incorporated in a fuel payment terminal.

FIG. 3 illustrates a fuel payment terminal 37 that incorporates the system. The fuel payment terminal 37 has a control unit 19 corresponding to the control unit of the fuel dispenser and to which a display 38, a keyboard 39 and a credit/payment card unit 40 is connected. The control unit 19 has a processor 20 and a memory 21, and three tamper detecting switches 24, 25, 26 are connected to the control unit 19 via one, common communication line 18.

The switches 24, 25, 26 are configured to detect misuse and cooperate with the control unit 19 via the communication line 18 in a manner corresponding to the control unit, communication line and tamper detecting switches of the fuel dispensing unit described above.

The invention claimed is:

1. A system for providing dispensing of fuel for refuelling vehicles, comprising a control unit and at least two switches, wherein each of said switches is connected to the control unit and comprises a microcontroller for storing a unique identifier, said identifier being associated with, and readable by, the control unit, for allowing the control unit to identify each of the at least two switches.

2. A system according to claim 1, wherein each switch comprises a power source.

3. A system according to claim 1, wherein each switch is configured to store a key which represents a condition that tampering of the fuel dispensing unit is undetected.

4. A system according to claim 3, wherein the key is altered when the switch is released.

5. A system according to claim 3, wherein the key is altered when the connection between the switch and the control unit is lost.

6. A system according to claim 3, wherein the control unit is configured to store a copy of each key, for the purpose of verifying if tampering of the fuel dispensing unit has occurred.

7. A system according to claim 3, wherein the control unit is configured to regularly read the key for each switch.

8. A system according to claim 3, wherein the control unit is configured to regularly change the key for each switch.

9. A system according to claim 1, wherein each of the at least two switches is connected to the control unit via a common communication line.

10. A system according to claim 1, further comprising a fuel dispensing unit.

11. A system according to claim 10, wherein the control unit is arranged in a first subspace of the fuel dispensing unit and each of the at least two switches is arranged in a second subspace of the fuel dispensing unit.

12. A system according to claim 11, wherein the first subspace and the second subspace are arranged for preventing fuel vapour from spreading between the subspaces.

13. A system according to claim 10, wherein each of the switches is connected to the control unit via a barrier device for explosion protection, said barrier device disposed between the switches and the control unit.

14. A system according to claim 10, wherein a sealing member is arranged between the first subspace and the second subspace for close abutment against a communication line that connects each of the at least two switches to the control unit.

15. A system according to claim 14, wherein a fuel flow meter is connected to the communication line.

16. A system according to claim 15, wherein each of the switches is connected to the control unit via the fuel flow meter.

17. A system according to claim 10, wherein the switches are arranged for detecting a respective fuel dispensing nozzle.

18. A system according to claim 1, further comprising a fuel payment terminal.

* * * * *